Jan. 10, 1967 P. B. SHUTT 3,296,798
MASTER CYLINDER
Filed June 23, 1965
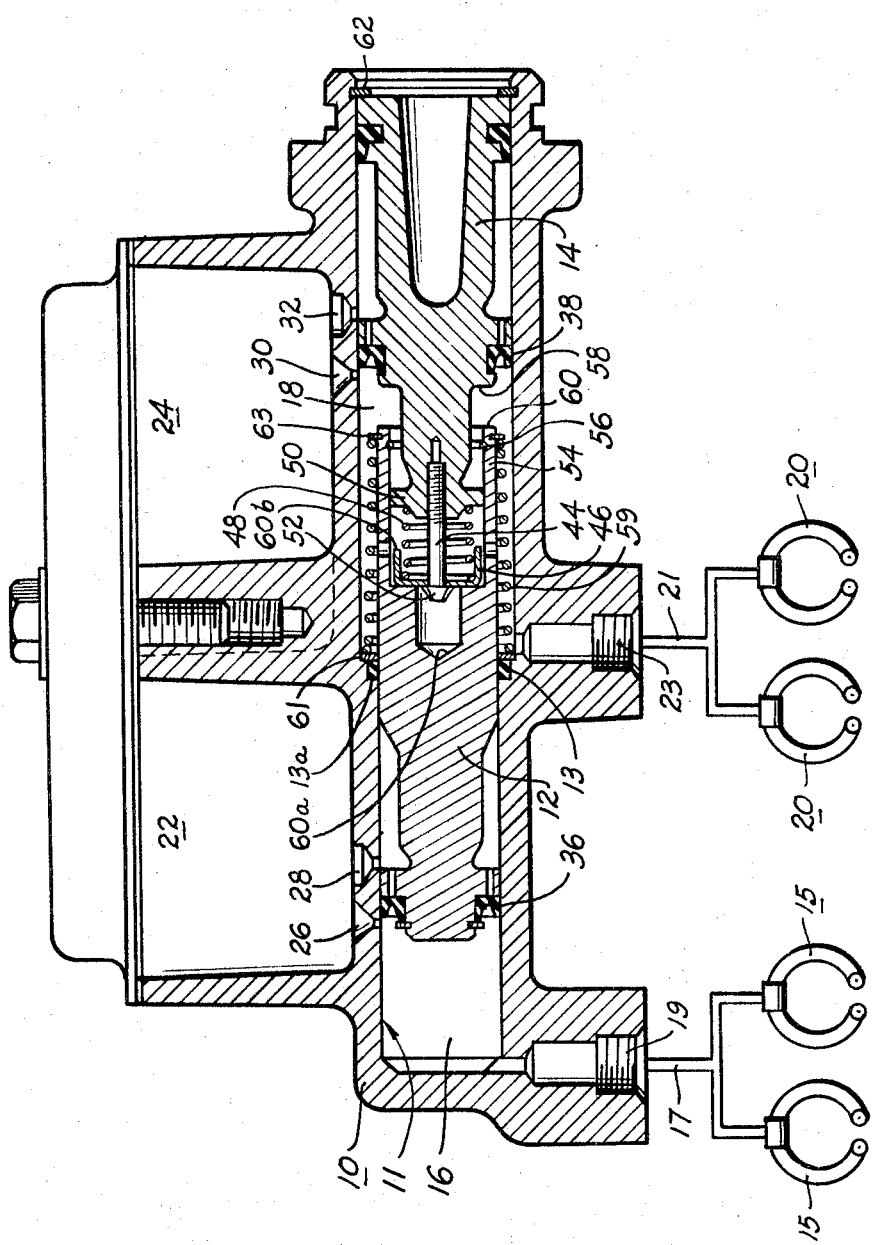
INVENTOR.
PAUL B. SHUTT.
BY
*Sheldon F. Raijes*
ATTORNEY.

3,296,798
MASTER CYLINDER
Paul B. Shutt, St. Joseph, Mich., assignor to The Bendix Corporation, a corporation of Delaware
Filed June 23, 1965, Ser. No. 466,214
12 Claims. (Cl. 60—54.6)

This invention relates to a master cylinder of the split system type.

It is an object of this invention to provide a split system type master cylinder with a construction wherein pressure in two separated actuating chambers are kept equalized regardless of relative adjustments between the brakes actuated thereby and which effects fluid actuation in one of the actuating chambers with a minimum pedal loss if pressure fails to develop in the other chamber.

It is a further object of this invention to interconnect two actuating plungers of a split system master cylinder in such a way that upon loss of pressure in one of the actuating chambers, the plungers need not be moved through their full stroke prior to developing pressure in the other actuating chamber.

Other objects will become apparent from the following description with reference to the drawing which illustrates a split system master cylinder in longitudinal cross section.

The master cylinder 10 has a stepped bore 11 with a pair of plungers 12, 14 slidably mounted therein. The diameter of the front portion of the bore is less than the diameter of the rear portion of the bore and the same is true of their respetcive plungers 12 and 14. An O-ring 13 is located on a shoulder 13a and sealingly engages the outer surface of the plunger 12 thereby separating the front portion of the bore from the rear portion of the bore. The plunger 12, the end, and side wall of the front portion of bore 11 constitute a front actuating chamber 16 and the plunger 14, the rear of plunger 12, and the side wall of the rear portion of the bore 11 constitute a rear actuating chamber 18. One set of brakes 15 is communicated to chamber 16 by a conduit 17 and outlet port 19 and another set of brakes 20 is communicated to chamber 18 by a conduit 21 and outlet port 23. Two separate reservoirs 22 and 24 are integral with the master cylinder body with the reservoir 22 being communicated to the front actuating chamber 16 by compensating and replenishing ports 26 and 28, respectively, and the reservoir 24 being communicated to the rear actuating chamber 18 by compensating and replenishing ports 30 and 32, respectively. Lip seals 36 and 38 are carried by the plungers 12 and 14, respectively, and are adapted to seal off compensating ports 26 and 30, respectively, when the plungers are actuated. A stud 44 is threadedly connected to the front end of the plunger 14. A spring retainer 46 is slidably mounted on the stud 44 and a compression spring 48 is compressed between a stop flange 50 and the spring retainer 46 urging the spring retainer into engagement with a head 52 on the stud 44. The front end of the plunger 14 is slidably received inside of a rear tubular end portion 54 of the plunger 12 and a snap ring 56 is connected to the inner surface of the tubular portion 54 for engagement with the stop flange 50 upon a predetermined relative movement of the plungers 12 and 14 away from each other. An annular shoulder 58 is provided on the plunger 14 for engagement with the end surface 60 of the tubular portion 54 upon a predetermined relative movement between the plungers 12 and 14 toward each other. A return spring 59 is compressed between a washer 61 and a snap ring 63 on the tubular portion 54 for urging the plunger 12 rearwardly into abutting engagement with the spring retainer 46 and also effecting rearward movement of the plunger 14 into engagement with a snap ring 62. Spring 48 is preloaded at a greater force than return spring 59. Therefore, engagement of the plunger 14 with the snap ring 62 determines the brake released position of the plungers 12 and 14. The return spring 59 also serves to hold the seal 13 in place.

In operation, actuation of the plunger 14 to the left will result in simultaneous actuation of the plunger 12 to the left by transfer of force through the spring 48 to the plunger 12. This will result in simultaneous closing of the compensating ports 26 and 30 by the seals 36 and 38, respectively, and further movement of the plunger 14 to the left will result in fluid pressurization in actuating chambers 16 and 18. If the brake assembly adjustments vary wherein more stroke is required of plunger 12 to build up a given pressure in the front chamber 16 than is required of plunger 14 to build up the same pressure in the rear chamber 18, then the plunger 12 will be moved forward relative to the plunger 14 by the fluid force in chamber 18 to maintain equalized pressures in both chambers. Assuming that more stroke is required by plunger 14 to build up a give pressure in the rear chamber 18 than is required by plunger 12 to build up the same pressure in the front chamber, then the plunger 14 will move forwards relative to the plunger 12 to maintain equalized pressures in both chambers.

Assuming that there has been a leak in the line 17 leading to the rear brakes 15 and therefore there is no pressure build up in the front chamber 16 upon actuation of the plunger 12, then initial pressure build up in the rear chamber will force the plunger 12 forwards relative to plunger 14 until the snap ring 56 engages the stop flange 50 on the plunger 14. Further movement to the left of plunger 14 will result in pressure build up in chamber 18. Assuming that there is a leak in line 21 leading to the brakes 20 and therefore there is no pressure in rear chamber 18 upon actuation of the plunger 14, the rear piston 14 will move forwardly relative to the front piston 12 until the shoulder 58 engages the end 60 of the tubular portion 54 thereafter providing a mechanical thrust to piston 12 to build up pressure in the front chamber 16.

Thus, it can be seen that master cylinder pedal loss is restricted to the distance between the O-ring 56 and the stop flange 50 upon failure in chamber 16 and between the shoulder 58 and the end 60 of the tubular portion 54 upon failure in chamber 18. Therefore, plunger 12 does not have to bottom before plunger 14 can produce pressure in the rear chamber 18 and the plunger 14 does not have to go through its full stroke in order to mechanically interconnect the plungers 14 and 12 in order to provide a thrust connection therebetween for producing pressure in the front chamber 16.

If desired, constructions other than shoulder 58 and end 60 may be utilized to provide for a thrust connection between the plungers upon pressure failure in chamber 18. For instance, the head 52 of stud 44 may engage the surface 60a, or flange 50 may engage the annular end 60b of spring retainer 46.

From the above, it can readily be seen that the above objects are achieved by the invention disclosed herein. It is my intention to include within the scope of the following claims all equivalent applications of the invention whereby the same or substantially the same results may be obtained.

I claim:

1. In a master cylinder housing comprising:
   a longitudinal stepped bore with the smaller diametered portion being forward of the larger diametered portion, a pair of axially spaced plungers disposed in said bore, the forward most plunger separating said bore into a forward fluid chamber and a rear fluid chamber, separate reservoir port means opening into each chamber, separate outlet port means for each chamber, one of said plungers having a recessed end extending away therefrom toward the other of said plungers, said other plunger having a portion projecting into said recess, first stop means located in said recess, second stop means carried by said projecting portion located on the side of said first stop means which is in an axial direction toward said one plunger for engagement with said first stop means, third stop means carried by said projecting portion axially spaced from said first and second stop means, an abutment member slidably carried by said other plunger, resilient means carried by said other plunger urging said abutment member into engagement with said third stop means, an abutment shoulder on said one plunger abutting said abutment member, and means providing a thrust connection between said plungers when said plungers move relatively toward each other a predetermined distance.

2. A master cylinder housing comprising:

a longitudinal stepped bore with the smaller diametered portion being forward of the larger diametered portion, a pair of axially spaced plungers disposed in said bore, the forward most plunger separating said bore into a forward fluid chamber and a rear fluid chamber, separate reservoir port means opening into each chamber, separate outlet port means for each chamber, one of said plungers having an annular hollow end extending away therefrom toward the other of said plungers, first stop means carried by said annular end, said other plunger having a portion projecting into said annular end, second stop means carried by said projecting portion, third stop means carried by said projecting portion located between said first and second stop means and arranged for engagement therebetween, an abutment member slidably carried by said other plunger and having a portion disposed between said second and third stop means, first resilient means carried by said other plunger urging said portion of said abutment member into engagement with said second stop means, an abutment shoulder on said one plunger, fourth stop means located on said master cylinder housing disposed for engagement by one of said plungers, second resilient means urging said one plunger rearwards to bring said abutment member and said abutment shoulder into abutting engagement with each other and thereby urge said plungers rearwardly as a unit against said fourth stop means, said second resilient means being weaker than said first resilient means, and means providing a thrust connection between said plungers when said plungers move relatively toward each other a predetermined distance.

3. In a master cylinder housing comprising:

a longitudinal stepped bore with the smaller diametered portion being forward of the larger diametered portion, a pair of axially spaced plungers disposed in said bore, the forward most plunger separating said bore into a forward fluid chamber and a rear fluid chamber, separate reservoir port means opening into each chamber, separate outlet port means for each chamber, one of said plungers having a recessed end extending away therefrom toward the other of said plungers, said other plunger having a portion projecting into said recess, first stop means located in said recess, second stop means carried by said projecting portion axially spaced from said first stop means in an axial direction toward said one plunger for engagement with said first stop means when plungers move relatively away from each other a distance determined by the axial space therebetween, third stop means carried by said projecting portion axially spaced from said first and second stop means, an abutment member slidably carried by said other plunger, resilient means carried by said other plunger urging said abutment member into engagement with said third stop means, an abutment shoulder on said one plunger abutting said abutment member, and means providing a thrust connection between said plungers when said plungers move relatively toward each other a predetermined distance.

4. A master cylinder housing comprising:

a longitudinal stepped bore with the smaller diametered portion being forward of the larger diametered portion, a pair of axially spaced plungers disposed in said bore, the forward most plunger separating said bore into a forward fluid chamber and a rear fluid chamber, separate reservoir port means opening into each chamber, separate outlet port means for each chamber, one of said plungers having a recessed end extending away therefrom toward the other of said plungers, said other plunger having a portion projecting into said recess, first stop means located in said recess, second stop means carried by said projecting portion axially spaced from said first stop means in an axial direction toward said one plunger for engagement with said first stop means when said plungers move relatively away from each other a distance determined by the axial space therebetween, third stop means carried by said projecting portion axially spaced from said first and second stop means, an abutment member slidably carried by said other plunger, first resilient means carried by said other plunger urging said abutment member into engagement with said third stop means, an abutment shoulder on said one plunger, fourth stop means located on said master cylinder housing disposed for engagement by one of said plungers, second resilient means urging said one plunger rearwards to bring said abutment member and said abutment shoulder into abutting engagement with each other and thereby urge said plungers rearwardly as a unit against said fourth stop means, said second resilient means being weaker than said first resilient means, and means providing a thrust connection between said plungers when said plungers move relatively toward each other a predetermined distance.

5. A master cylinder housing comprising:

a longitudinal stepped bore with the smaller diametered portion being forward of the larger diametered portion, a pair of axially spaced plungers disposed in said bore, the forward most plunger separating said bore into a forward fluid chamber and a rear fluid chamber, separate reservoir port means opening into each chamber, separate outlet port means for each chamber, one of said plungers having an annular hollow end extending away therefrom toward the other of said plungers, first stop means carried by said annular end, said other plunger having a portion projecting into said annular end, second stop means carried by said projecting portion, third stop means carried by said projecting portion axially spaced from and located between said first and second stop means, said third and first stop means being arranged for engagement therebetween when said plungers move relatively away from each other a predetermined distance, an abutment member slidably carried by said other plunger and having a portion disposed between said second and third stop means, first resilient means carried by said other plunger urging said portion of said abutment member into engagement with said second stop means, an abutment shoulder on said one plunger, fourth stop means located on said master cylinder housing disposed for engagement by one of said plungers, second resilient means urging said one plunger rearwards to bring said abutment member and said abutment shoulder into abutting engagement with each other and thereby urge said plungers rearwardly as a unit against said fourth stop means, said second resilient means being weaker than said first resilient means, and means providing a thrust connection between said plungers when said plungers move relatively toward each other a predetermined distance.

6. The structure as recited in claim 5, wherein said means providing a thrust connection between said plungers comprises the end edge of said annular end and an annular shoulder on said other plunger axially spaced from said end edge, said end edge being located between said third stop means and said last named shoulder.

7. The structure as recited in claim 6 wherein said third stop means is an annular flange on said projecting portion contiguous the inner surface of the wall of said annular end.

8. The structure as recited in claim 6 wherein said projecting portion is located on the rear plunger.

9. The structure as recited in claim 8 wherein said second resilient means is a coil spring surrounding said annular end supported at one end on the wall of said bore and at its other end on said annular end of said forward most plunger.

10. The structure as recited in claim 5 wherein said means providing a thrust connection between said plungers comprises the end of said projecting portion and the bottom of said hollow end.

11. The structure as recited in claim 5 wherein said means providing a thrust connection between said plungers comprises an annular shoulder on said other plunger and an annular axially extending portion on said abutment member.

12. The structure as recited in claim 5 wherein said means providing said thrust connection between said plungers comprises said first means, said first resilient means comprising a coil spring, said plungers being so spaced that said coil spring will fully compress to effect said thrust connection.

No references cited.

MARTIN P. SCHWADRON, *Primary Examiner.*
R. R. BUNEVICH, *Assistant Examiner.*